United States Patent [19]

Kortschack

[11] Patent Number: 6,117,460
[45] Date of Patent: Sep. 12, 2000

[54] METHOD OF PRODUCING STABLE MEAT PRODUCTS AND SAUSAGES, PRODUCED IN THE PRESENCE OF MICROORGANISMS

[76] Inventor: Fritz Kortschack, Katzwanger Steig 36a, D-14089 Berlin, Germany

[21] Appl. No.: 09/331,140
[22] PCT Filed: Dec. 15, 1997
[86] PCT No.: PCT/EP97/07033
  § 371 Date: Jul. 29, 1999
  § 102(e) Date: Jul. 29, 1999
[87] PCT Pub. No.: WO98/26667
  PCT Pub. Date: Jun. 25, 1998

[30] Foreign Application Priority Data

Dec. 26, 1996 [DE] Germany ............ 196 53 677

[51] Int. Cl.$^7$ ............ A23B 4/00; A23L 1/317; A23L 3/015
[52] U.S. Cl. ............ 426/56; 426/58; 426/105
[58] Field of Search ............ 426/465, 105, 426/56, 58, 574, 281, 332

*Primary Examiner*—Keith D. Hendricks
*Attorney, Agent, or Firm*—St. Onge Steward Johnston & Reens, LLC

[57] ABSTRACT

This invention is directed to a method of fixing pH values in smoked sausages, strongly smoked sausages, smoked ham and similar products and allows permanent stabilization of these values by subjecting the goods to be treated to a high-pressure treatment when the goods have reached a predetermined pH. To this end the sausage and meat products have to be enclosed in an impermeable outer packing which conforms well to the product shape. Subsequently, the goods to be treated are subjected to high pressure (c.400 to 600 MPa) for several minutes in a special pressure vessel.

3 Claims, No Drawings

METHOD OF PRODUCING STABLE MEAT PRODUCTS AND SAUSAGES, PRODUCED IN THE PRESENCE OF MICROORGANISMS

This application is a 371 of PCT/EP97/07033, filed Dec. 15, 1997.

SPECIFICATION

This invention is directed to a method of fixing or stabilizing pH values in smoked sausages, strongly smoked sausages, smoked ham and similar products and allows permanent stabilization of these values during subsequent drying and storage.

When a predetermined pH has been reached, the goods to be treated are subjected to a high-pressure treatment in a special pressure vessel. To this end the sausage and meat products have to be enclosed in an impermeable outer packing which conforms well to the shape of the product. The goods to be treated are then exposed to high pressure (c.400 to 600 MPa) for several minutes.

The type of pressure transferring medium—for instance water to which optionally a corrosion protectant has been added—is of secondary importance. The high-pressure treatment is performed at room temperatures. Elastic products such as sausage and meat products will regain their original shape subsequent to the pressure treatment.

What is of decisive significance is the fact that subsequent to the high-pressure treatment the pH of the correspondingly treated smoked and strongly smoked products will not change anymore within the so far known storage life.

The current state of the art as related to the high-pressure treatment of food is described by professor Dr. G. Lehmann in an article published in "Fleischwirtschaft", No. 10, October 1996, Verlagsgruppe Deutscher Fachverlag, Frankfurt/Main, pp.1004–1005, as quoted below:

The development of high pressures applied to food was the starting point for a novel technology for the gentle treatment of food with the intention, on the one hand, of sterilizing the same and on the other hand, of achieving effects similar to those obtained when food is prepared by being boiled at high temperature.

In addition to the killing of microorganisms, proteins will be denatured, enzymes will be deactivated, and the starch will be gelatinized. The high-pressure treatment affects large molecules whereas smaller ones such as amino acids, vitamins or flavoring agents will remain intact.

Since the high-pressure treatment of meat is a non-thermal process, neither toxic components nor off-flavors will be produced. The sample, which is packaged in flexible sheet material, is compacted under pressure to a greater or lesser degree, any gas-filled voids will disappear, and upon relaxation the original shape is regained. The pressure medium used is water, and a pressure between 5000 and 7000 bars is employed for the treatment of meat.

At present, several research institutes are working on autoclave sterilization.

As a novel process in food technology several methods have been developed in recent years with the aim of extending the storage life of products by killing microorganisms which lead to spoilage, thereby to retain the freshness. These novel methods make use of a carbon dioxide supercritical pressure or a high static pressure.

What happens in the course of the high-pressure treatment of food is set out below:

denaturing of proteins,
gelatinizing of starch,
activation of enzymes, and
killing of microorganisms, insects and parasites.

Hence, the use of high pressure affects the three-dimensional structure of the molecules. In this connection the large molecules such as proteins, enzymes and polysaccharides are clearly more vulnerable while smaller molecules such as, for instance, amino acids, vitamins and other low-molecular substances, which are of significance in respect of taste, color and nutritional value, will remain intact.

In addition to the activation of enzymes, killing of microorganisms certainly is one of the most important effects of the high-pressure treatment of food. This sterilization is an alternative to the known methods and offers the great advantage that the natural state and the original freshness of the products are conserved. As compared to thermal processes, the advantage resides in that the properties of food such as flavor, structure and storage life may be improved, because chemical reactions such as, for instance, the Maillard reaction which during thermal treatment may have a detrimental effect on the food quality do not take place in the case of high-pressure treatment. As compared to thermally altered foods, the ingredients exhibit significant differences. Thus, in contrast to a boiled egg, an egg which has become solidified by treatment with several thousand atmospheres of pressure does not contain any unnatural amino acids. It has no foreign sulfurous flavor and contains the original amount of all of the vitamins present in the raw egg. Also, the raw taste is retained.

On baked goods, the retrogradation of starch treated at high pressure is far slower than after thermal treatment. Due to the resulting delayed onset of staleness, the freshness of baked goods may be prolonged. Likewise, starch subjected to pressure treatment is more readily enzymatically decomposed by means of amylases, so that baked goods are more readily digestible. Results have shown that, when meat is subjected to treatment, the proteolytic activity can be controlled by the high pressure so that the quality of the meat is improved.

Hence, the high-pressure treatment constitutes a non-thermal process using hydrostatic pressures of from 6,000 to 12,000 bars at room temperature. This treatment has an effect on the treated food which is similar to the thermal treatment while yielding the above-mentioned advantages. 1,000 bars are required to achieve an effect on the ingredients similar to a temperature increase by 10° C., but there neither results a boiling flavor nor are vitamins or color components affected in a detrimental way.

To carry out the process, the articles of food packaged in flexible sheets are placed in feed racks or baskets which are then introduced into the pressure vessel filled with water as a pressure transfer medium. The thermoplastic materials used in the food industry may also be used as packaging materials. Subsequent to charging the pressure vessel is sealed and pressure is built up by introducing a piston into the pressure vessel until the preset pressure is reached. Pressure vessel volumes are between 100 and 12,000 liters. The hydraulic mechanism for moving the piston operates in the low-pressure range so that high operational safety is ensured and the high-pressure apparatus are considered safe, all the more as hydrostatic pressures are concerned, i.e. nothing but compressed liquids are concerned which, in contrast to gases, expand only very slightly when pressure-relieved. Therefore the amounts of energy which are set free upon sudden pressure relief are very small.

The high-pressure technology per se is easy to control. Pressure is the most important parameter, time and temperature are of secondary importance because energy is introduced into the system via the pressure. The pressure build-up may occur within less than one minute, and the pressure reduction may be performed within less than one second.

The known high-pressure treatment processes for foods are used as substitutes for the thermal sterilization methods commonly employed so far. Their effect on the treated food is similar to that of thermal treatment but they offer the advantages that smaller molecules such as amino acids, vitamins and other low-molecular substances, which are relevant as to taste, color and nutritional value, will remain intact. The novel process describes the use of a high-pressure treatment in order to safely deactivate any undesirable biochemical processes within minutes.

The current state of the art concerning the technology of producing smoked sausages is described in the textbook "DIE FABRIKATION FEINER FLEISCH- UND WURSTWAREN", p.90 et seq. The $20^{th}$ edition of said book was published in 1992 by "Deutscher Fachverlag", Frankfurt/Main.

In the last two decades there have been considerable improvements relating to simpler methods of manufacturing smoked sausages. When the raw material is accurately processed with proper regard to normal hygienic rules and proper handling of modern technologies, faulty products can be virtually excluded. However, for the sake of objectivity it should be mentioned that due to the simplification of a production process fresh problems of various kinds may come up which were unknown so far. A typical example in this respect is the production of smoked sausage by the use of GdL (D-gluconic acid 5-lactone). This fast-maturing agent has made it possible to manufacture a ready-for-sale smoked sausage within 48 hours. But it is evident that, irrespective of safety and speed, the taste of a smoked sausage manufactured with GdL may degrade considerably after about 2 to 3 weeks. Sometimes a rancid/woody secondary flavor may develop, and in any case the storage life of such goods leaves much to be desired. Mainly, this can be explained by the fact that the production of smoked sausages is governed by a maturing or ripening process which cannot be controlled solely by the application of technology. The maturing process which is influenced only externally cannot guarantee an article that is always perfect.

In order to ensure the internal maturing process as well, science has taken up the problem. It has been found in the field of meat research that the maturing of smoked sausages is a biological process which is mainly controlled by bacteria. Without bacteria, smoked sausage can never be obtained from smoked sausage stock. Starter cultures have been developed for properly aiding this process. Such cultures are microorganisms which become active in the smoked sausage also in case of normal natural maturing and which provide the desired features of a smoked sausage of good quality. A deficiency of useful bacteria is frequently found in the raw material whereas the harmful germs are predominant. It is therefore proper to add a sufficient amount of maturing bacteria in the form of starter cultures.

Certain types of bacteria were isolated from hundreds of smoked-sausage germs. These were grown at a large scale and offered in lyophilized and frozen form, thus allowing them to be used in a very simple way for the manufacture of smoked sausage.

Quick re-reddening and safe retaining of color are caused by the special micrococci which quickly decompose saltpeter into nitrite (nitrate reductase) and nitrite into nitrogen oxide (nitrite reductase). The desired stable re-reddening color will then be formed through further intermediate stages. The use of nitrite pickling salt will also achieve re-reddening within a short period of time without any color change and without gray shades in the cutting face.

By means of the starter cultures the safety of production as a whole is optimized and a final product is obtained which is perfect in respect of taste and flavor. The enzyme formed by the micrococci is the cause of prolonged storage life, whereby the risk of rancidity is largely avoided.

Quick cutting resistance is achieved due to the capacity of the lactobacilli to convert sugar into lactic acid. The pH will be decreased without affecting the flavor and taste which are formed. No undesirable acids are formed. No pungent taste occurs. On the contrary, the sausage becomes milder.

Processing of starter cultures is not more difficult than that of the GdL products. The use thereof is quite simple and without any risks provided the manufacturers' processing instructions are observed.

The process of post-maturing in the hanging room is of the utmost importance in respect of both storage life and the stabilization of color and flavor. In particular long-keeping or strongly smoked sausages, which are liable to more stringent requirements in regard of storage life, must undergo sufficient post-maturing.

A supplement should be added here: When describing manufacturing processes it is frequently overlooked that smoked sausages also include the coarse or fine soft smoked sausages for spreading etc. Re-reddening, lowering of the pH, microbacilli, i.e. many biochemical reactions, proceed in a way similar to or exactly as in the case of cutting-resistant smoked sausages. The only feature not provided is curing by drying. In most cases drying is undesirable anyway because then the sausage will lose its elasticity and its spreading capacity. Some curing is actually achieved by the pH reduction, the corresponding addition of salt and smoking of the sausages. In order to be at all marketable the sausage must have been re-reddened and subjected to fermentation, i.e. in addition to re-reddening the pH should be less than 5.5 and the microorganisms should predominantly comprise lactobacilli and micrococci species (microorganisms in smoked sausages) (Quoted from W. Frey: "Die sichere Fleischwarenherstellung, Leitfaden fur den Praktiker", Hans Holzmann-Verlag 1992).

The manufacturing process of smoked and strongly-smoked goods cannot be standardized: biochemical processes are required for the products to turn out well. The behaviour of the co-operating live microorganisms is dependent on a multiplicity of factors some of which cannot be influenced.

It is the objective of the present invention to provide a method according to which the steps of manufacturing smoked and strongly smoked sausages may be performed in a simple and safe way and whereby a final product of stable quality is obtained.

The specified object is solved in accordance with claim 1 in that the desired final pH of the smoked and the strongly smoked goods is adjusted and maintained accurately.

The method in accordance with the present invention allows the manufacturer to inhibit the activities of the desirable as well as the undesirable microorganisms at a clearly defined timing by means of the high-pressure treatment. In this respect it is of no account which of the commonly used maturing methods (air conditioning, quick maturing or natural maturing process) is employed.

In any case the pH will remain stable in the semifinished products subsequent to the high-pressure treatment. There will be no further relevant biochemical processes.

The help of live organisms is indispensable in the manufacture of smoked and strongly smoked goods. Although the manufacture of smoked sausages is considered to be a very robust technology there is always the risk that due to microbiological risks faulty articles of poor quality or deficient color and storage stability may be obtained. Irrespective of the use of starter cultures it happens again and again that unforseeable circumstances lead to deviations in quality. For instance, an initially high number of starting germs in the raw material, high amounts of added sugar, insufficient moisture removal from the raw products or faulty temperature control during maturing will normally result in excessive acidification. Similar causes are responsible for the activities of peroxide forming agents, so that in addition to a negative development of flavor the products quickly tend to become rancid.

When processing GdL it was frequently found that only freshly produced food could be consumed. Older products developed an unpleasant, deviating flavor. This defect is due to the undesirable activity of microorganisms in the article of food.

The specified faulty developments during the manufacture of smoked and strongly smoked goods can be prevented by the high-pressure treatment of the semifinished products as soon as the desired pH has been reached. Subsequent to such a treatment, which does not otherwise affect the product in any way, the marketability (color and storage stability) of the products is extended many times over.

Subsequent to proper manufacture, maturing, high-pressure treatment and optionally further drying or matching according to DE 44 10 332 C1, the smoked and strongly smoked goods, which feature high color and storage stability, may be marketed. The method according to this invention makes sure that upon completion of the production process the smoked and strongly smoked goods will no longer be liable to any direct changes—in respect of quality, flavor and color—due to biochemical processes.

EXAMPLE

In an experiment several commercially available smoked soft sausages of a batch were subjected to a high-pressure treatment immediately after smoking.

Pressure: below 500 MPa

Treatment period: c.10 minutes

Temperature: 20° C.

Lactobacilli prior to treatment: $3.0 \cdot 10^8$ KBEg$^{-1}$

Lactobacilli after treatment: $1.4 \cdot 10^4$ KBEg$^{-1}$

By varying the pressure intensity, the period of treatment and the time of treatment as dependent on the degree of maturing of the semifinished products it is possible to adjust the desirable reductions in bacilli in any desired way.

A method of manufacturing stable meat and sausage products produced in the presence of microorganisms and subjected to maturing and drying, characterized in that, when the semifinished products have reached the desired pH, they are subjected to a high-pressure treatment at room temperature for several minutes, whereafter they are further processed as usual.

What is claimed is:

1. A method of manufacturing a meat product subjected to curing and drying in the presence of microbacilli and/or other bacteria, comprising the steps of:

a) curing and drying the meat product to a desired pH; and b) subjecting the meat product to high pressure treatment within the range of about 400 to about 600 Mpa at room temperature, wherein the pH of the meat product is stabilized and remains at said desired pH subsequent to said high pressure treatment, and wherein step (b) does not include a heat treatment process.

2. The method of claim 1 wherein the meat product comprises semifinished products.

3. The method of claim 2 wherein said semifinished products are selected from the group consisting of smoked, strongly smoked and hard sausage.

* * * * *